United States Patent
Bornsen

(10) Patent No.: US 9,164,172 B2
(45) Date of Patent: *Oct. 20, 2015

(54) COMPENSATION FOR DEPTH FINDERS

(76) Inventor: Brett L. Bornsen, Thornton, CO (US)

( * ) Notice: Subject to any disclaimer, the term of this patent is extended or adjusted under 35 U.S.C. 154(b) by 773 days.

This patent is subject to a terminal disclaimer.

(21) Appl. No.: 13/448,138

(22) Filed: Apr. 16, 2012

(65) Prior Publication Data

US 2012/0201098 A1     Aug. 9, 2012

Related U.S. Application Data

(63) Continuation-in-part of application No. 12/763,975, filed on Apr. 20, 2010, now Pat. No. 8,179,741.

(51) Int. Cl.
| | | |
|---|---|---|
| *G01S 15/88* | (2006.01) | |
| *G01S 15/96* | (2006.01) | |
| *G01S 7/52* | (2006.01) | |
| *G01S 15/10* | (2006.01) | |
| *G01S 7/62* | (2006.01) | |

(52) U.S. Cl.
CPC ............ *G01S 15/96* (2013.01); *G01S 7/52004* (2013.01); *G01S 15/10* (2013.01); *G01S 7/62* (2013.01)

(58) Field of Classification Search
CPC ...... G01S 15/96; G01S 15/10; G01S 7/52004
USPC ........................................... 367/12, 87, 88, 99
See application file for complete search history.

(56) References Cited

U.S. PATENT DOCUMENTS

| | | | | |
|---|---|---|---|---|
| 3,017,606 | A * | 1/1962 | Kietz et al. ...................... | 367/12 |
| 4,104,608 | A * | 8/1978 | Melling et al. .................. | 367/12 |
| 4,210,897 | A * | 7/1980 | Hutchins ........................ | 367/106 |
| 4,302,824 | A * | 11/1981 | Goymour ........................ | 367/19 |
| 4,697,253 | A * | 9/1987 | Lind et al. ...................... | 367/12 |
| 5,065,371 | A * | 11/1991 | Leavell et al. ................. | 367/111 |
| 5,594,707 | A * | 1/1997 | Goto et al. ..................... | 367/111 |
| 6,201,763 | B1 * | 3/2001 | Bourgeois et al. .............. | 367/12 |
| 6,466,514 | B1 * | 10/2002 | Kabel .............................. | 367/98 |
| 6,836,707 | B2 * | 12/2004 | Sowada et al. .................. | 701/21 |
| 8,179,741 | B2 * | 5/2012 | Bornsen .......................... | 367/99 |

* cited by examiner

*Primary Examiner* — Ian J Lobo
(74) *Attorney, Agent, or Firm* — Duft Bornsen & Fettig LLP

(57) ABSTRACT

System and methods for compensating a depth signal for a depth finder of a boat. In one embodiment, a compensation system is implemented between the depth finder and a transducer mounted on the boat. The compensation system receives a depth signal (i.e., a plurality of electrical impulses) from the transducer that directs sound waves toward the bottom of a body of water. The compensation system also monitors a change in elevation of the transducer, such as due to waves rocking the boat. The compensation system then compensates the depth signal based on the change in elevation, and provides the compensated depth signal to the depth finder.

20 Claims, 7 Drawing Sheets

COMPENSATION FOR DEPTH FINDERS

RELATED APPLICATIONS

This non-provisional patent application is a continuation-in-part of U.S. patent application Ser. No. 12/763,975 filed on Apr. 20, 2010, which is incorporated herein by reference.

FIELD OF THE INVENTION

The invention relates to the field of depth finders or fish finders.

BACKGROUND

A depth finder (also referred to as a fish finder) uses active sonar to detect fish and the bottom of a body of water. The depth finder then displays them on a graphical display device, such as an LCD or CRT screen. Depth finders generally operate by transmitting electrical impulses to a transducer. The transducer converts the electrical impulses into sound waves, and directs the sound waves into the water. When the sound waves strikes the bottom, a fish, or some other object, they are reflected back to the transducer. The transducer senses the reflected sound waves, converts the reflected sound waves into electrical impulses, and transmits electrical impulses back to the depth finder. The depth finder then measures the amount of time between when an electrical impulse was sent to the transducer and when an electrical impulse was received back from the transducer to determine the depth of the object that was struck by the sound waves. This process is repeated several times per second so that the depth finder is able to determine and display the bottom of the water, fish, and other objects.

One problem with present depth finders is that an accurate depth reading is not obtained when the transducer is rising and falling due to rough water. It is common for boats to operate in rough water (e.g., waves in excess of 2 feet). When waves on the water reach 2 feet, 3 feet, 4 feet, or even more, the boat rocks on the waves. With the transducer mounted on the boat, the transducer rises and falls as the boat rocks on the waves. When the transducer moves in this manner, the depth reading will rise and fall along with the transducer, which results in a bottom reading that is inaccurate and difficult to read.

SUMMARY

Embodiments provided herein compensate for an inaccurate depth reading when a transducer is rising and falling. A compensation system may be implemented between the transducer and the depth finder. The compensation system receives a depth signal (i.e., a plurality of electrical impulses) from the transducer. The compensation system also monitors a change in elevation of the transducer, such as due to waves. The compensation system then compensates the depth signal based on the change in elevation, and provides the compensated depth signal to the depth finder. This advantageously results in a bottom reading that is more accurate even when the transducer is rising and falling along with waves.

Another exemplary embodiment comprises an enclosure, a first connector that protrudes through the enclosure and is configured to connect to a transducer via a first cable, a second connector that protrudes through the enclosure and is configured to connect to a depth finder via a second cable, and a compensation circuit electrically connected to the first and second connectors. The compensation circuit is configured to receive a sense signal from the depth finder, and to provide the sense signal to the transducer. The compensation circuit is further configured to receive a depth signal from the transducer that directs sound pulses toward the bottom of a body of water based on the sense signal and detects reflections of the sound pulses, to determine a change in elevation of the transducer, to convert the change in elevation to a time-based correction factor, to adjust the depth signal received from the transducer based on the time-based correction factor to compensate for the change in elevation of the transducer, and to provide the compensated depth signal to the depth finder for displaying an image of the bottom of the body of water.

Another embodiment is an apparatus comprising an enclosure, a first connector that protrudes through the enclosure and is configured to connect to a transducer via a first cable, a second connector that protrudes through the enclosure and is configured to connect to a depth finder via a second cable, and a compensation circuit electrically connected to the first and second connectors. The compensation circuit is configured to receive a sense signal from the depth finder, and to provide the sense signal to the transducer. The compensation circuit is further configured to receive a depth signal from the transducer, to determine a change in elevation of the transducer, to compensate the depth signal based on the change in elevation of the transducer, and to provide the compensated depth signal to the depth finder.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
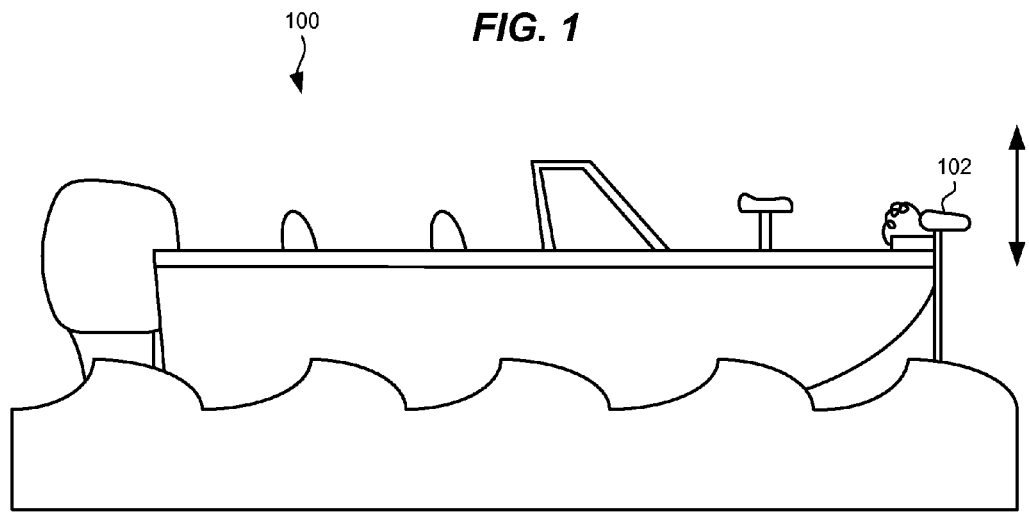
FIG. 1 illustrates a boat operating on a body of water.
Figure 2:
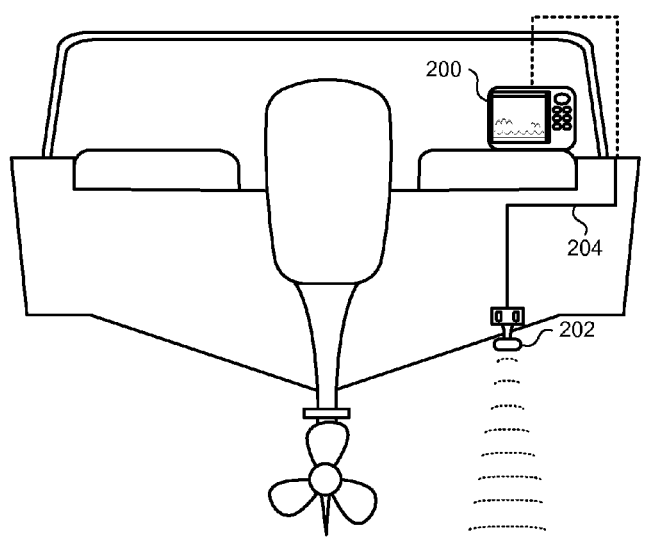
FIG. 2 illustrates a depth finder and transducer installed on a boat.

FIG. 1 illustrates a boat 100 operating on a body of water. The purpose of this figure is to show that boat 100 is operating in waves. Due to the waves, boat 100 will rock up and down as illustrated by the arrows. FIG. 2 illustrates a depth finder 200 and transducer 202 installed on boat 100. Depth finder 200 represents any device operable to detect a bottom surface of a body of water using sonar. Depth finder 200 is also operable to detect fish or other objects, and thus may also be referred to as a fish finder. Some examples of depth finder 200 are units produced by Lowrance Electronics, Humminbird, etc.

Figure 3:
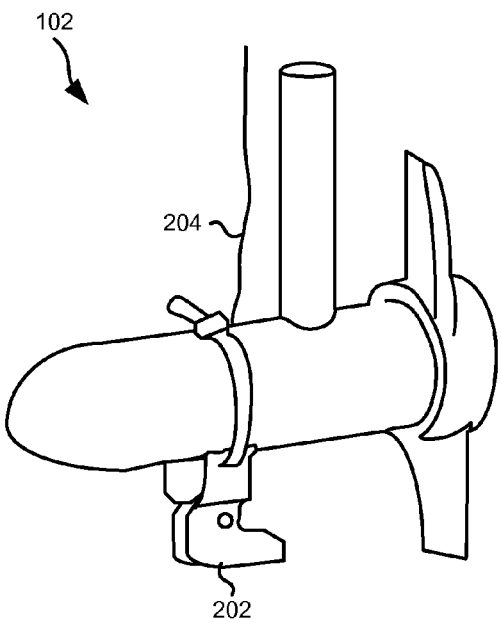
FIG. 3 illustrates a transducer mounted on a trolling motor.

Depth finder 200 is connected to transducer 202 by a transducer cable 204. Transducer 202 may be mounted on boat 100 in a variety of locations. In FIG. 2, transducer 202 is mounted on the transom of boat 100. However, transducer 202 may alternatively be mounted on the bottom of the trolling motor 102 (as illustrated in FIG. 3) or mounted in other locations.

When in operation, a transmitter (not shown) within depth finder 200 transmits electrical impulses to transducer 202 over cable 204 (see FIG. 2). The electrical impulses sent from depth finder 200 to transducer 202 may be referred to as a sense signal. Transducer 202 receives the impulses and converts the impulses into sound waves or sound pulses. Transducer 202 then directs the sound waves into the water. When the sound waves strike the bottom (or a fish or some other object), the sound waves are reflected back and detected by transducer 202. When transducer 202 senses the reflected sound waves, it converts the sound waves into electrical impulses and transmits the electrical impulses back to depth finder 200 over cable 204. The electrical impulses sent from transducer 202 to depth finder 200 may be referred to as a depth signal. Depth finder 200 then measures the amount of time between when the electrical impulses were sent to transducer 202 and when the electrical impulses were received back from transducer 202 to determine the depth of the object(s) that was struck by the sound waves. This process is repeated several times per second so that depth finder 200 is able to determine and display the bottom of the water.

In the embodiments described herein, depth finder 200 (and its associated systems) and transducer 202 may be configured for traditional sonar-type operation, or may be configured for side-imaging and/or bottom imaging. Side-imaging and bottom imaging provides picture-like images of the bottom of a body of water and any objects. Therefore, depth finder 200 may transmit a sense signal to transducer 202 that is used for side-imaging and/or bottom imaging. Likewise, transducer 202 may transmit a depth signal to depth finder 200 that is used for side-imaging and/or bottom imaging.

Figure 4:
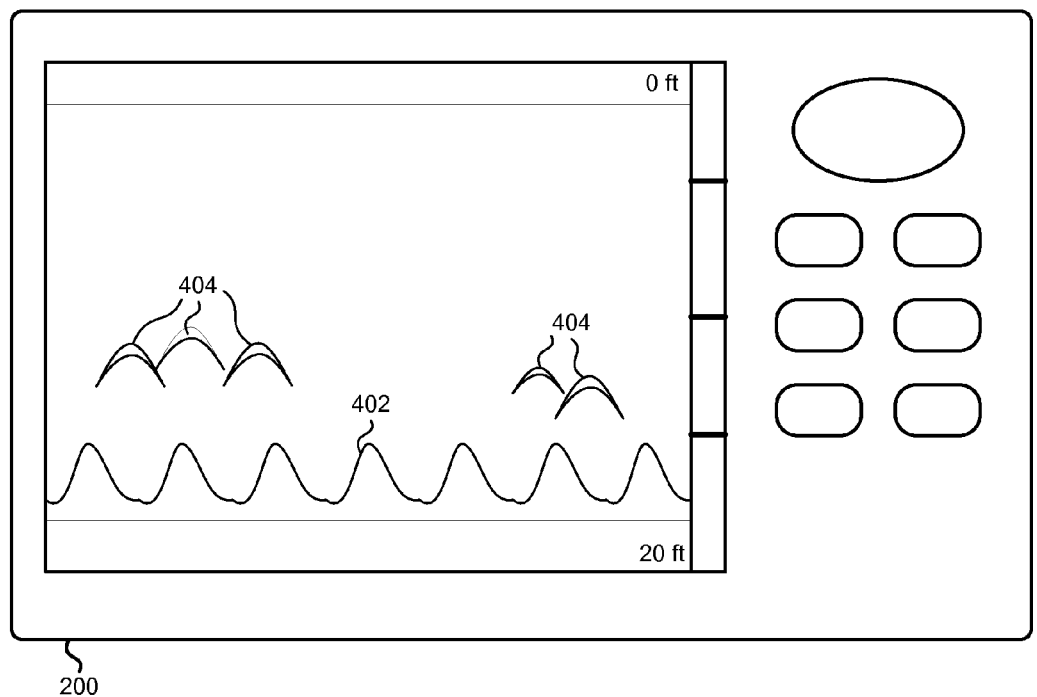
FIG. 4 illustrates a display of a depth finder showing a bottom reading.

FIG. 4 illustrates a display of depth finder 200. The screen of depth finder 200 shows a bottom reading illustrated by line 402. The screen of depth finder 200 also displays fish 404 that are a detected. One problem with the bottom reading 402 in FIG. 4 is that the reading oscillates. For example, the bottom reading is oscillating between about 15 feet and 19 feet. The cause of this oscillation is that boat 100 (see FIG. 1) is operating in rough water. When boat 100 rocks on the waves, the transducer 202 rises and falls with the waves. The rise and fall of the transducer 202 causes an oscillating bottom reading that is difficult to read.

Figure 5:
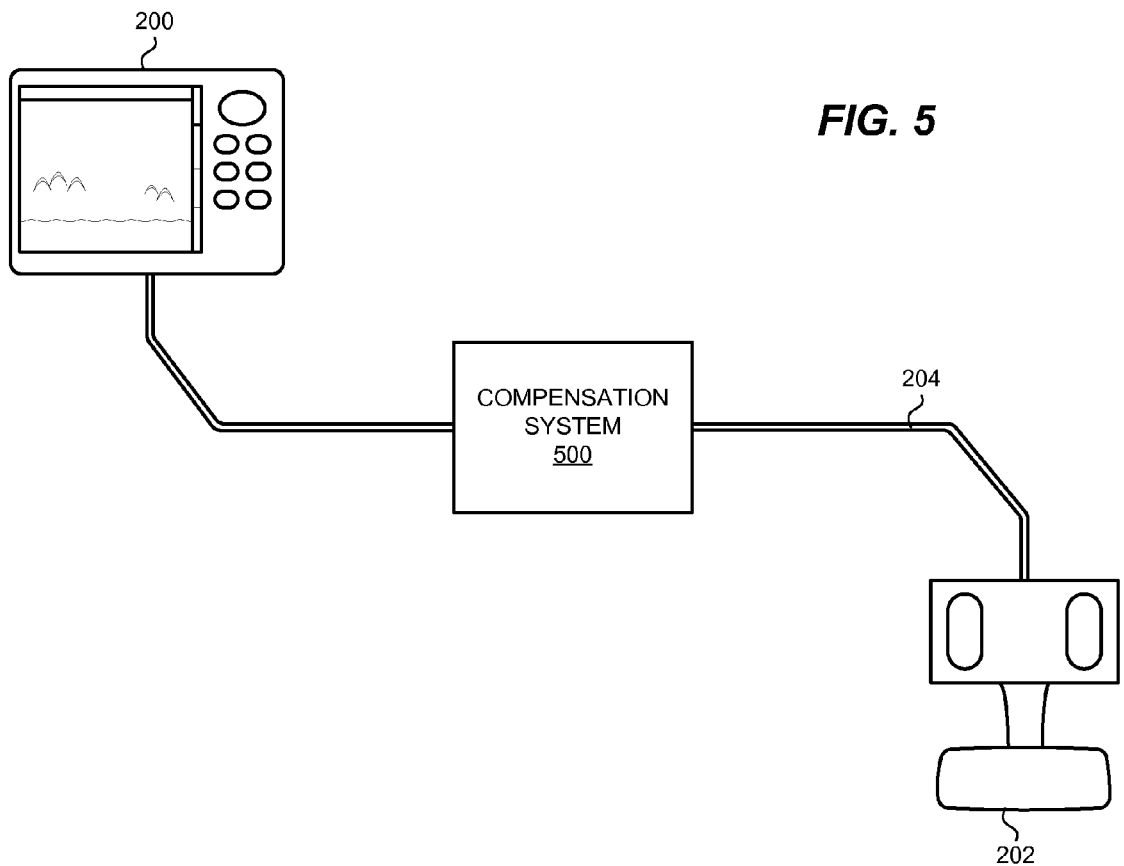
FIG. 5 illustrates a compensation system in an exemplary embodiment.

The embodiments provided herein solve this problem by compensating the bottom reading. FIG. 5 illustrates a compensation system 500 in an exemplary embodiment. Compensation system 500 is connected between depth finder 200 and transducer 202. Compensation system 500 may be implemented as a stand alone device as illustrated in FIG. 5. In other embodiments, compensation system 500 may be integrated within depth finder 200, transducer 202, or both.

Figure 6:
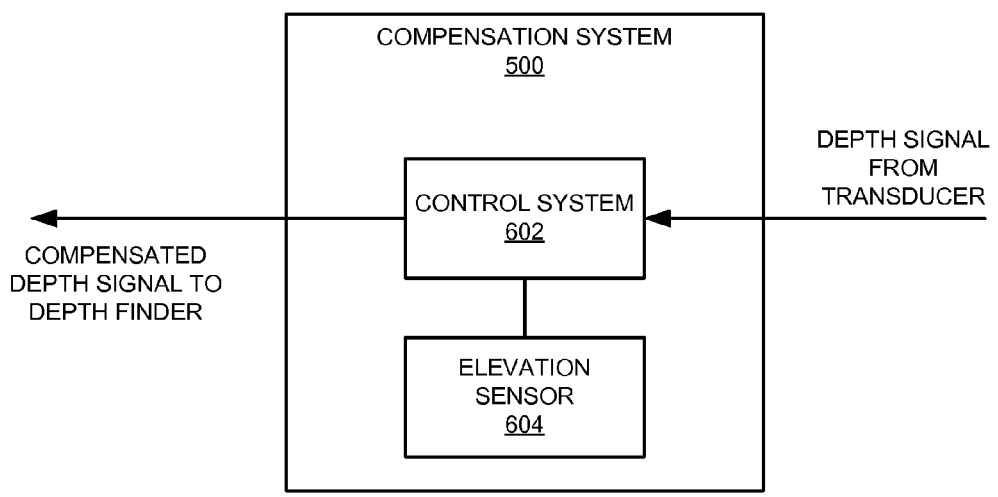
FIG. 6 is a block diagram of a compensation system in an exemplary embodiment.

FIG. 6 is a block diagram of compensation system 500 in an exemplary embodiment. Compensation system 500 includes a control system 602 and an elevation sensor 604. Control system 602 comprises any device, component, or function operable to modify, change, or adjust a depth signal from a transducer. Elevation sensor 604 comprises any device or component operable to determine a change in elevation, height, or altitude of an object. Elevation sensor 604 may comprise any type of desired sensor. As one example, elevation sensor 604 may comprise a GPS device that is able to determine an elevation with an acceptable accuracy. In another embodiment, elevation sensor 604 may comprise an altitude sensor. However, a designer may choose many other types of sensors for elevation sensor 604.

Figure 7:
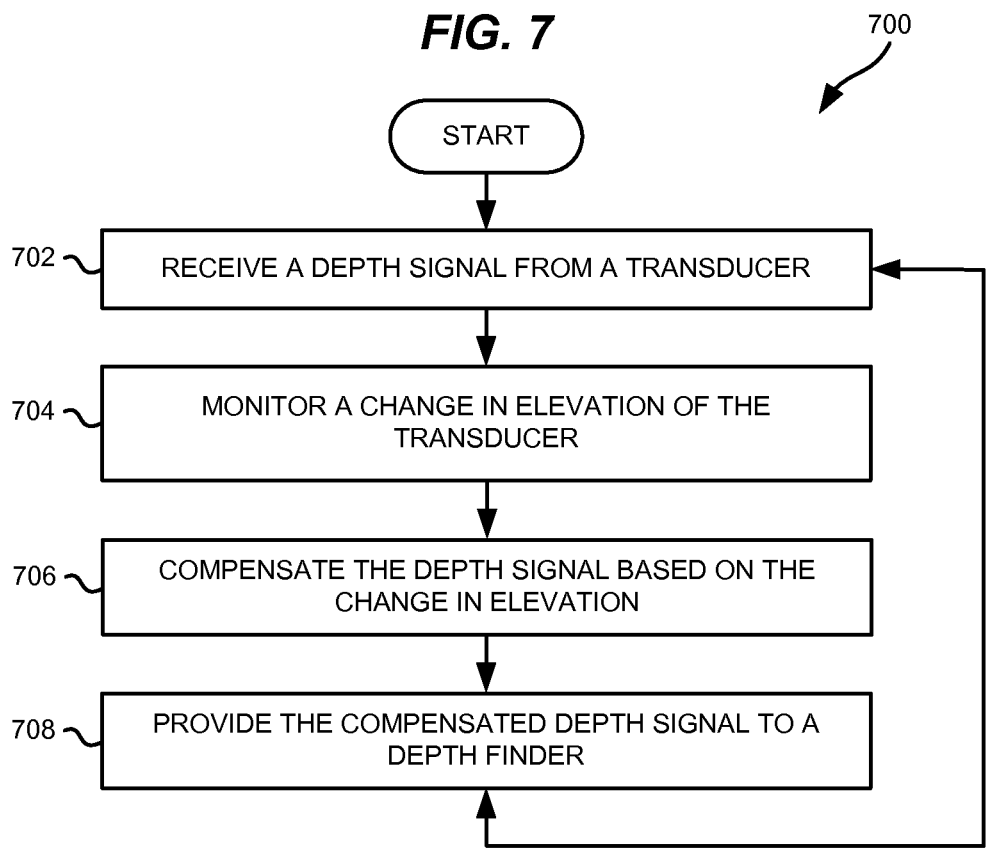
FIG. 7 is a flow chart illustrating a method of compensating a depth signal in an exemplary embodiment.

FIG. 7 is a flow chart illustrating a method 700 of compensating a depth signal in an exemplary embodiment. The steps of method 700 will be described with reference to compensation system 500 in FIGS. 5-6, although method 700 may be performed in other systems. The steps of the flow charts described herein are not all inclusive and may include other steps not shown. The steps may also be performed in an alternative order.

In step 702, control system 602 receives a depth signal from transducer 202. As stated above, transducer 202 directs sound waves toward the bottom of a body of water. Transducer 202 detects the sound waves that are reflected, and generates electrical impulses responsive to detecting the reflected sound waves. The depth signal thus comprises the electrical impulses generated by transducer 202.

In step 704, elevation sensor 604 monitors or determines a change in elevation of transducer 202. Elevation sensor 604 may monitor a change in elevation of transducer 202 in a variety of ways. In one embodiment, elevation sensor 604 determines a normalized or average elevation of transducer 202. Having the normalized elevation, elevation sensor 604 may then measure an elevation of transducer 202 at any given time. Elevation sensor 604 may then compare the measured elevation to the normalized elevation to determine the change in elevation at any given time. If the measured elevation is greater than the normalized elevation, then there has been a rise in transducer 202. If the measured elevation is less than the normalized elevation, then there has been a fall in transducer 202. For example, as transducer 202 rises and falls due to waves, elevation sensor 604 monitors how much transducer 202 rises and falls. Assume that the normalized elevation of transducer 202 is $elevation_{norm}$. At any given time, elevation sensor 604 may measure an elevation ($elevation_{measured}$), and compare the measured elevation to the normalized elevation. The change in elevation ($elevation_{change}$)=$elevation_{measured}$−$elevation_{norm}$. If $elevation_{change}$>0, then there is a rise in transducer 202. If $elevation_{change}$<0, then there is a fall in transducer 202. These calculations may be done continually, such as several times per second, so that the change in elevation of transducer 202 may be determined at any time.

In another embodiment, elevation sensor 604 may estimate the change in elevation of transducer 202 based on a number of factors. For example, elevation sensor 604 may determine how much boat 100 is rocking, and may estimate the change in elevation of transducer 202 accordingly. Elevation sensor 604 may estimate the change in elevation of transducer 202 based on the speed of the wind. Elevation sensor 604 may estimate the change in elevation of transducer 202 based on the speed of boat 100. Elevation sensor 604 may estimate the change in elevation of transducer 202 based on the length of the boat. There may be many other factors used to estimate how much the elevation of transducer 202 changes due to waves.

In step 706, control system 602 compensates the depth signal based on the change in elevation of transducer 202. In one embodiment, control system 602 converts the change in elevation to a correction factor, such as a time-based correction factor. For example, a change in elevation may be in feet, and control system 602 may convert the change in elevation in feet to a millisecond, nanosecond, or some other time-based correction factor. Control system 602 then adjusts the depth signal based on the correction factor to generate the compensated depth signal. One example of adjusting the depth signal is illustrated in FIG. 8.

Figure 8:
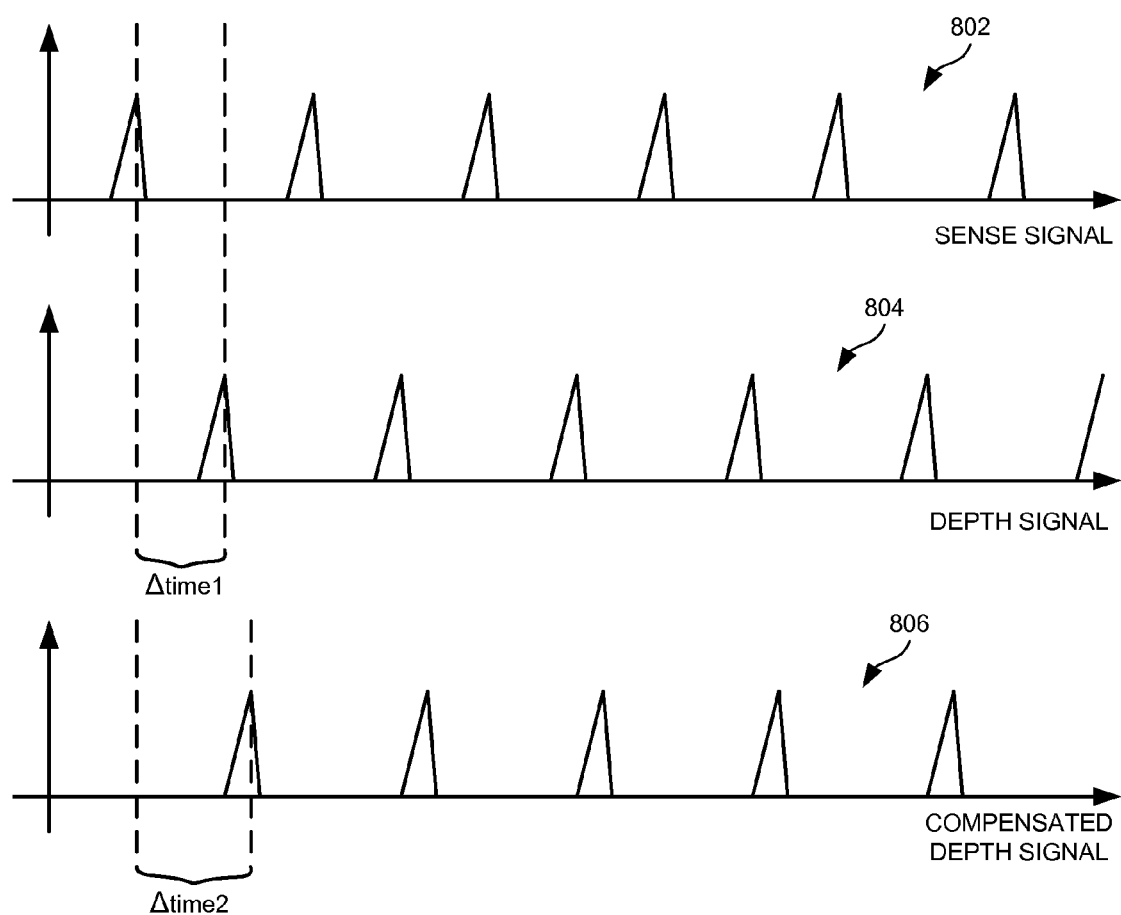
FIG. 8 illustrates graphs showing how a depth signal may be adjusted in an exemplary embodiment.

FIG. 8 illustrates graphs showing how a depth signal may be adjusted in an exemplary embodiment. The top graph 802 represents the sense signal that is sent from depth finder 200 to transducer 202. The sense signal comprises a plurality of electrical impulses at a frequency, such as 200 kHz. The middle graph 804 represents the depth signal that is sent from transducer 202 to depth finder 200. If there is no compensation of the depth signal, depth finder 200 would calculate a depth based on the time difference ($\Delta time1$) between impulses of the sense signal and impulses of the depth signal.

The bottom graph 806 represents the compensated depth signal. Assume that elevation sensor 604 has determined that there is a fall in transducer 202. In other words, the measured elevation is less than the normalized elevation. When this occurs, control system 602 may delay the depth signal for a time period, which is known as a phase shift. The amount of delay depends on the magnitude of the change in elevation of transducer 202. For example, a change in elevation of 4 feet results in a delay that is greater than if the change was 2 feet. Also, the delay and corresponding phase shift will vary in time. As the change in elevation varies over a time period, the phase shift of the depth signal will likewise vary. The delay added to the depth signal compensates for the fall in elevation of transducer 202 and generates the compensated depth signal. Thus, depth finder 200 calculates a depth based on the time difference ($\Delta time2$) between impulses of the sense signal and impulses of the compensated depth signal, which is a more accurate reading.

If there were to be a rise in transducer 202, then control system 602 may advance the next depth signal in time (assuming there is some type of buffering for the signal).

Figure 9:
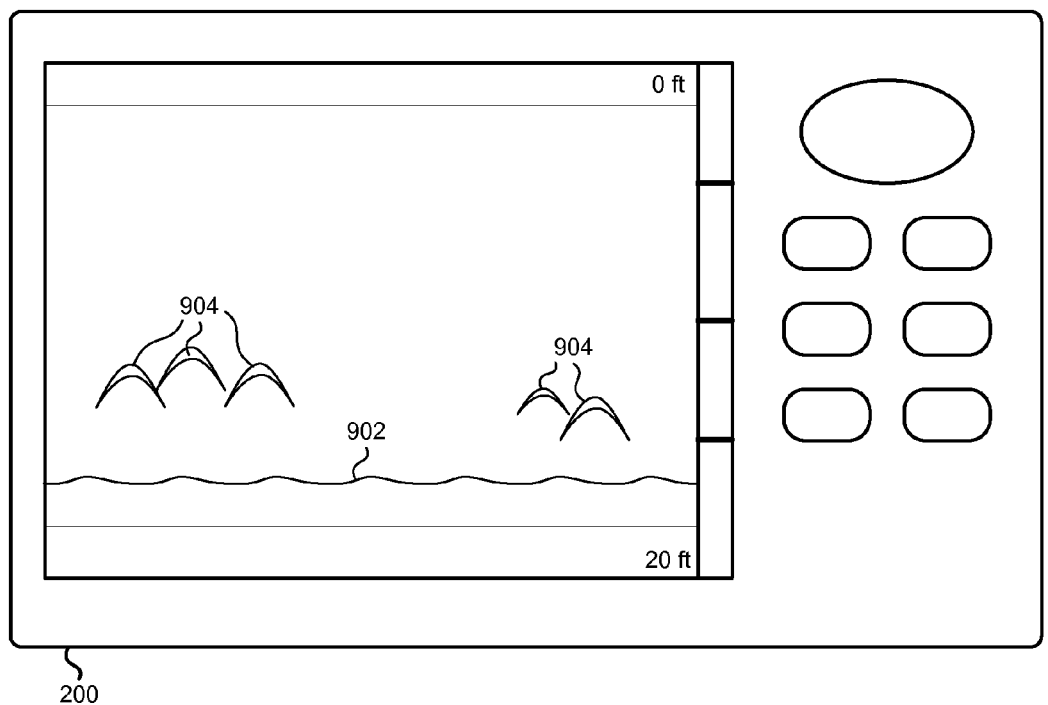
FIG. 9 illustrates a display of a depth finder showing a bottom reading in an exemplary embodiment.

In step 708 of FIG. 7, control system 602 provides the compensated depth signal to depth finder 200. Method 700 is continually repeated so that the depth signal is compensated as transducer 202 rises and falls. Depth finder 200 is then able to display a bottom reading based on the compensated depth signal. FIG. 9 illustrates a bottom reading in an exemplary embodiment. The screen of depth finder 200 shows a bottom reading illustrated by line 902. The screen of depth finder 200 also displays fish 904 that are detected. Due to the compensated depth signal, the bottom reading more accurately represents the bottom of the body of water. As a comparison to FIG. 4 (uncompensated), the bottom reading 402 of FIG. 4 oscillates and does not truly represent the bottom of the body of water. In FIG. 9, the bottom reading 902 does not oscillate and is not affected by the rise and fall of transducer 202. Even though transducer 202 may be rising and falling several feet, the bottom reading 902 is still accurate due to the compensation of the depth signal. This is advantageous to the user of depth finder 200, as the bottom reading 902 is accurate no matter how rough the water may be.

Figure 10:
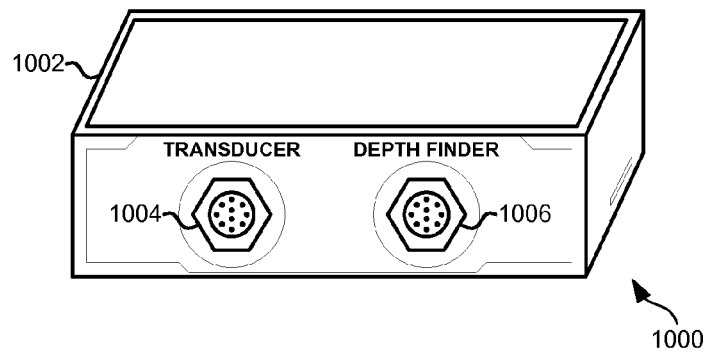
FIG. 10 illustrates a stand-alone compensation system in an exemplary embodiment.

As stated above, compensation system 500 may be a stand-alone device that is installed between depth finder 200 and transducer 202. FIG. 10 illustrates a stand-alone compensation system 1000 in an exemplary embodiment. Compensation system 1000 includes an enclosure 1002 that houses the circuitry for compensating the depth signal. Enclosure 1002 may be water-proof to protect the circuitry housed within. System 1000 further includes a connector 1004 that protrudes through enclosure 1002 and is configured to connect to transducer 202 via a cable (not shown). System 1000 further includes a connector 1006 that protrudes through enclosure 1002 and is configured to connect to depth finder 200 via a cable (not shown). Connectors 1004 and 1006 may be NMEA compliant, as well as the cabling used to connect system 1000 to depth finder 200 and transducer 202. System 1000 may thus retrofit to an existing depth finder and transducer that is mounted on a boat.

Figure 11:
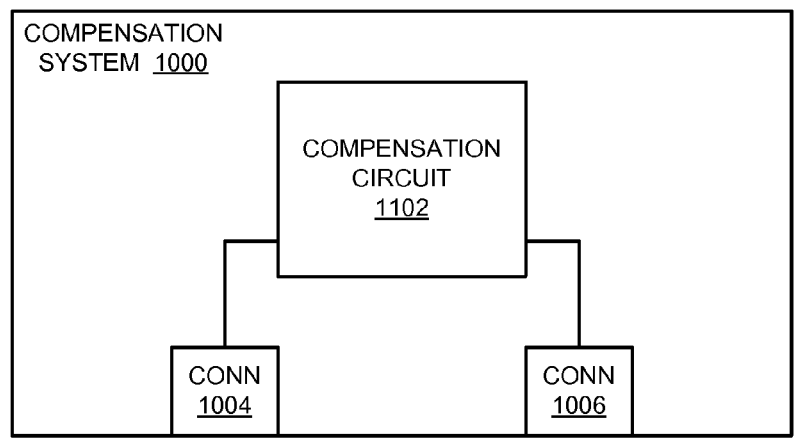
FIG. 11 is a schematic view of a compensation system in an exemplary embodiment.

FIG. 11 is a schematic view of compensation system 1000 in an exemplary embodiment. This view shows the internal circuitry of system 1000. The circuitry includes connectors 1004 and 1006, and a compensation circuit 1102 electrically connected to connectors 1004 and 1006. Compensation circuit 1102 is configured to receive a sense signal from depth finder 200, and to provide the sense signal to transducer 202 (see also FIG. 2). Compensation circuit 1102 is further configured to receive a depth signal from transducer 202, to determine a change in elevation of transducer 202 (such as through an elevation sensor), to convert the change in elevation to a correction factor (e.g., time-based), and to adjust the depth signal received from transducer 202 based on the correction factor. This compensates for the change in elevation of transducer 202. Compensation circuit 1102 is further configured to provide the compensated depth signal to depth finder 200. Depth finder 200 may then display an image of the bottom of the body of water.

Figure 12:
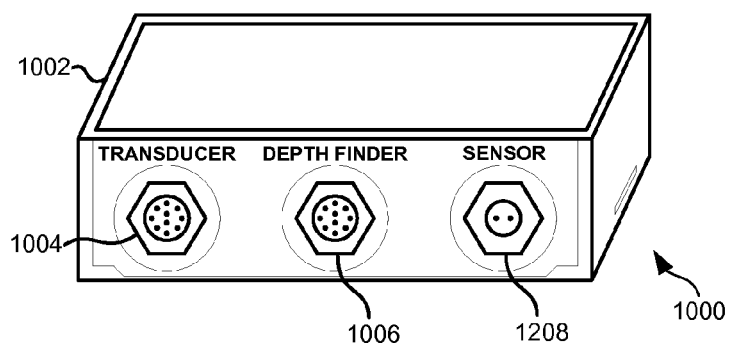
FIG. 12 illustrates a stand-alone compensation system used with an external elevation sensor in an exemplary embodiment.

An elevation sensor used conjunction with compensation system 1000 may be internal or external. FIG. 12 illustrates a stand-alone compensation system 1000 used with an external elevation sensor in an exemplary embodiment. If the elevation sensor is external to compensation system 1000, then compensation system 1000 may further include a connector 1208 that protrudes through enclosure 1002 and is configured to connect to the elevation sensor via a cable (not shown). When the elevation sensor is external, it may be connected anywhere on the boat to provide the best measurements.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

I claim:

1. An apparatus comprising:
a compensation system configured to receive a signal from a transducer that directs sound pulses toward the bottom of a body of water and detects reflections of the sound pulses, to determine a change in elevation of the transducer, to convert the change in elevation to a time-based correction factor, to adjust the signal received from the transducer based on the time-based correction factor to compensate for the change in elevation of the transducer, and to provide the compensated signal to a depth finder that displays an image of the bottom of the body of water.

2. The apparatus of claim 1 wherein:
the compensation system is further configured to delay at least one impulse of the signal from the transducer to compensate for a fall in elevation of the transducer.

3. The apparatus of claim 1 wherein:
the compensation system is further configured to advance at least one impulse of the signal from the transducer to compensate for a rise in elevation of the transducer.

4. The apparatus of claim 1 wherein:
the signal received from the transducer comprises a side-imaging signal.

5. The apparatus of claim 1 wherein:
the signal received from the transducer comprises a down-imaging signal.

6. The apparatus of claim 1 wherein:
the compensation system is housed in a water-proof enclosure.

7. The apparatus of claim 6 further comprising:
a first connector that protrudes through the enclosure and is configured to connect to a cable attached to the transducer; and
a second connector that protrudes through the enclosure and is configured to connect to a cable attached to the depth finder.

8. The apparatus of claim 7 wherein:
the first and second connectors are NMEA compliant.

9. The apparatus of claim 7 further comprising:
a third connector that protrudes through the enclosure and is configured to connect to an external elevation sensor that detects elevation changes of the transducer.

10. An apparatus comprising:
an enclosure;
a first connector that protrudes through the enclosure and is configured to connect to a transducer via a first cable;
a second connector that protrudes through the enclosure and is configured to connect to a depth finder via a second cable; and
a compensation circuit electrically connected to the first and second connectors;
wherein the compensation circuit is configured to receive a sense signal from the depth finder, and to provide the sense signal to the transducer;
wherein the compensation circuit is further configured to receive a depth signal from the transducer that directs sound pulses toward the bottom of a body of water based on the sense signal and detects reflections of the sound pulses, to determine a change in elevation of the transducer, to convert the change in elevation to a time-based correction factor, to adjust the depth signal received from the transducer based on the time-based correction factor to compensate for the change in elevation of the transducer, and to provide the compensated depth signal to the depth finder for displaying an image of the bottom of the body of water.

11. The apparatus of claim 10 wherein:
the compensation circuit is further configured to delay at least one impulse of the depth signal from the transducer to compensate for a fall in elevation of the transducer.

12. The apparatus of claim 10 wherein:
the compensation system is further configured to advance at least one impulse of the depth signal from the transducer to compensate for a rise in elevation of the transducer.

13. The apparatus of claim 10 wherein:
the depth signal received from the transducer comprises a side-imaging signal.

14. The apparatus of claim 10 wherein:
the depth signal received from the transducer comprises a down-imaging signal.

15. The apparatus of claim 10 wherein:
the enclosure is water-proof.

16. The apparatus of claim 10 wherein:
the first and second connectors are NMEA compliant.

17. The apparatus of claim 10 further comprising:
a third connector that protrudes through the enclosure and is configured to connect to an external elevation sensor that detects elevation changes of the transducer.

18. An apparatus comprising:
an enclosure;
a first connector that protrudes through the enclosure and is configured to connect to a transducer via a first cable;
a second connector that protrudes through the enclosure and is configured to connect to a depth finder via a second cable; and
a compensation circuit electrically connected to the first and second connectors;
wherein the compensation circuit is configured to receive a sense signal from the depth finder, and to provide the sense signal to the transducer;
wherein the compensation circuit is further configured to receive a depth signal from the transducer, to determine a change in elevation of the transducer, to compensate the depth signal based on the change in elevation of the transducer, and to provide the compensated depth signal to the depth finder.

19. The apparatus of claim 18 wherein:
the depth signal received from the transducer comprises a side-imaging signal.

20. The apparatus of claim 18 wherein:
the depth signal received from the transducer comprises a down-imaging signal.

* * * * *